United States Patent
Lee et al.

(10) Patent No.: US 8,497,797 B2
(45) Date of Patent: Jul. 30, 2013

(54) TWO-DIMENSIONAL ARRAY ANTENNA AND DEVICE FOR DETECTING INTERNAL OBJECT USING THE SAME

(75) Inventors: Dae Heon Lee, Daejeon (KR); Sung Hyun Kim, Daejeon (KR); Sang Woo Cho, Daejeon (KR); Ji Eun Choi, Daejeon (KR)

(73) Assignee: Electronics and Telecomunication Research Institute, Daejeon (KR)

( * ) Notice: Subject to any disclaimer, the term of this patent is extended or adjusted under 35 U.S.C. 154(b) by 268 days.

(21) Appl. No.: 12/878,618

(22) Filed: Sep. 9, 2010

(65) Prior Publication Data
US 2011/0227777 A1 Sep. 22, 2011

(30) Foreign Application Priority Data
Mar. 22, 2010 (KR) ........................ 10-2010-0025097

(51) Int. Cl.
*G01S 13/00* (2006.01)

(52) U.S. Cl.
USPC .................. 342/22; 342/27; 342/75; 342/179

(58) Field of Classification Search
USPC ............ 342/22, 27, 74, 75, 82–88, 176, 179, 342/191
See application file for complete search history.

(56) References Cited

U.S. PATENT DOCUMENTS

| | | | | |
|---|---|---|---|---|
| 6,445,334 | B1* | 9/2002 | Bradley et al. .................. | 342/22 |
| 6,674,403 | B2 | 1/2004 | Gray et al. | |
| 2004/0155810 | A1* | 8/2004 | Witten ............................ | 342/22 |
| 2006/0061504 | A1* | 3/2006 | Leach et al. .................... | 342/22 |
| 2009/0135045 | A1* | 5/2009 | Beeri .............................. | 342/22 |
| 2009/0140907 | A1* | 6/2009 | Keller et al. .................... | 342/22 |
| 2009/0237092 | A1* | 9/2009 | Zoughi et al. ................. | 324/637 |
| 2009/0295618 | A1* | 12/2009 | Beeri et al. ..................... | 342/22 |
| 2010/0117885 | A1* | 5/2010 | Holbrook et al. ............... | 342/22 |
| 2011/0050479 | A1* | 3/2011 | Mohamadi et al. ............. | 342/22 |

FOREIGN PATENT DOCUMENTS

| | | |
|---|---|---|
| JP | 11-174160 A | 7/1999 |
| KR | 1998-0006619 A | 3/1998 |
| KR | 10-2003-0020722 A | 3/2003 |
| KR | 10-2004-0001712 A | 1/2004 |
| KR | 10-2006-0125093 A | 12/2006 |

OTHER PUBLICATIONS

Zhijun Chen; Wei Hong; Zhenqi Kuai; Jixin Chen; Ke Wu; , "Circularly polarized slot array antenna based on substrate integrated waveguide," Microwave and Millimeter Wave Technology, 2008. ICMMT 2008. International Conference on , vol. 3, No., pp. 1066-1069, Apr. 21-24, 2008.*

Young-Jin Park et al., "High Resolution Ground Penetrating Image Radar Using an Ultra Wideband (UWB) Impulse Waveform", Journal of the Institute of Electronics Engineers of Korea TC, vol. 42, No. 11, Nov. 2005.

* cited by examiner

*Primary Examiner* — John B Sotomayor
*Assistant Examiner* — Marcus Windrich
(74) *Attorney, Agent, or Firm* — LRK Patent Law Firm (57) ABSTRACT

Provided are a two-dimensional array antenna and a device for detecting an internal object using the same. The device includes a plurality of unit antennas in a two-dimensional array of m columns and n rows on a board (where m and n are integers greater than 1), a first switch selecting one or more transmitting antenna to radiate a pulse signal onto an internal object in a structure from among the unit antennas; a second switch selecting one or more receiving antenna to collect a signal reflected from the internal object from among the unit antennas, and a transceiving analysis module analyzing information about the position and shape of the internal object.

7 Claims, 9 Drawing Sheets

TWO-DIMENSIONAL ARRAY ANTENNA AND DEVICE FOR DETECTING INTERNAL OBJECT USING THE SAME

CROSS-REFERENCE TO RELATED APPLICATION

This application claims priority to and the benefit of Korean Patent Application No. 10-2010-0025097, filed Mar. 22, 2010, the disclosure of which is incorporated herein by reference in its entirety.

BACKGROUND

1. Field of the Invention

The present invention relates to a two-dimensional array antenna and a device for detecting an internal object using the same, and more particularly, to a two-dimensional array antenna capable of more precisely detecting the position and shape of an internal object in real time, and a device for detecting the internal object using the same.

2. Discussion of Related Art

Nondestructive testing apparatuses for detecting internal objects radiate electromagnetic waves onto a structure, measure the electromagnetic waves reflected from the structure, and detect the position and shape of an internal object buried in the structure.

In the case of conventional nondestructive testing apparatuses, since an area to be detected is divided into grids, and the position and shape of an internal object are detected by moving a transceiving antenna and an encoder along the grids in transverse and longitudinal directions, much time may be required and trouble may be generated in obtaining the results of detecting the internal object.

SUMMARY OF THE INVENTION

The present invention is directed to a two-dimensional array antenna capable of detecting the position and shape of an internal object buried in a structure in real time without moving a device for detecting the internal object, and a device for detecting the internal object using the same.

One aspect of the present invention provides a two-dimensional array antenna, which includes: a plurality of unit antennas arranged in a two-dimensional array of m columns and n rows on a board (where m and n are integers greater than 1); a first switch selecting one or more transmitting antenna to radiate a pulse signal onto an internal object in a structure from among the unit antennas; a second switch selecting one or more receiving antenna to collect a signal reflected from the internal object from among the unit antennas; a first motor moving a position of the board on which the unit antennas are set in array in a transverse direction that is a lengthwise direction of the board; and a second motor moving the position of the board on which the unit antennas are set in array in a longitudinal direction that is a width direction of the board.

The first and second motors may move the position of the board within an area that the internal object is suspected to occupy in the transverse and longitudinal directions of the board by a preset interval.

Each unit antenna may include a taper slot antenna having a bandwidth between 1 GHz and 10 GHz.

The unit antennas may be fixed to the board at an angle of 45 degrees inclined to the transverse or longitudinal direction of the board.

Another aspect of the present invention is to provide a device for detecting an internal object, which includes: the two-dimensional array antenna according to one aspect of the present invention; and a transceiving analysis module that includes a transmitting unit generating a pulse signal and transmitting the generated pulse signal to a selected transmitting antenna, a receiving unit collecting a reflected signal from a selected receiving antenna, and a signal processing unit providing a trigger signal for generating the pulse signal, digitizing the reflected signal, and analyzing information about the position and shape of the internal object on the basis of the reflected signal.

The transmitting unit may generate the pulse signal according to the trigger input signal, and amplify the power of the generated pulse signal.

The receiving unit may perform low-noise amplification, attenuation, and power adjustment, and convert the received signal into a digital signal.

The device may further include a display module displaying the information about the position and shape of the internal object analyzed by the transceiving analysis module. The information about the position and shape of the internal object may be displayed on the display module in a two-dimensional or three-dimensional image.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

The present invention will now be described more fully hereinafter with reference to the accompanying drawings, in which exemplary embodiments of the invention are shown. Throughout the drawings, it should be noted that the same reference numerals or symbols are used to designate like or equivalent elements having the same function. The detailed descriptions of known function and construction unnecessarily obscuring the subject matter of the present invention will be omitted.

Figure 1A:
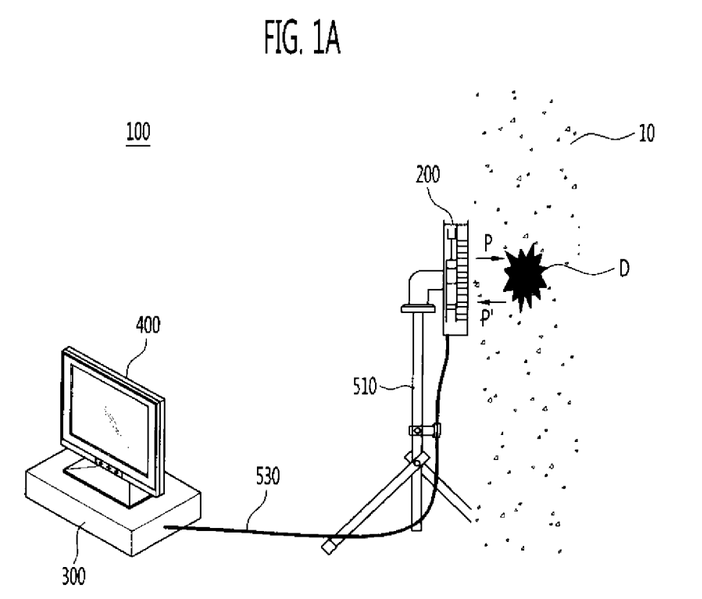
FIGS. 1A and 1B schematically illustrate a two-dimensional array antenna and a device for detecting an internal object using the same according to an exemplary embodiment of the present invention.
Figure 1B:
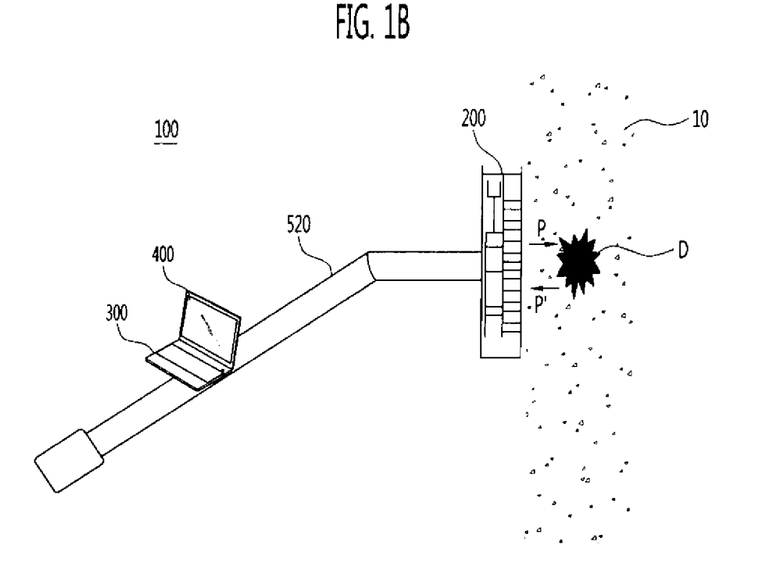

FIGS. 1A and 1B schematically illustrate a two-dimensional array antenna and a device for detecting an internal object using the same according to an exemplary embodiment of the present invention.

Referring to FIGS. 1A and 1B, the device for detecting an internal object according to an exemplary embodiment of the present invention radiate pulse signals P onto an internal object D in a structure 10 using a two-dimensional array antenna 200, collects signals P' reflected from the internal object D, provides the pulse signals P to the two-dimensional array antenna 200 using a transceiving analysis module 300, analyzes information about the position and shape of the internal object D on the basis of the received signals P' received from the two-dimensional array antenna 200, and displays the information about the position and shape of the internal object D on a screen using a display module 400.

According to an exemplary embodiment, the two-dimensional array antenna 200 is composed of 32 transmitting antennas and 32 receiving antennas, and is electrically operated. Thereby, it is possible to detect a specific area occupied by the internal object D in real time without moving the two-dimensional array antenna 200. For the purpose of precise detection, the two-dimensional array antenna 200 is moved at intervals of the unit antennas in a transverse or longitudinal direction using a motor, so that it is possible to extract information about an accurate shape of the internal object D.

Here, the two-dimensional array antenna 200 may be fixed to a tripod 510 or a graspable rod 520. The pulse signals P and the reflected signals P' can be transferred via an integrated cable 530. The display module 400 may display information about the position and shape of the internal object D in a two-dimensional or three-dimensional image.

Figure 2:
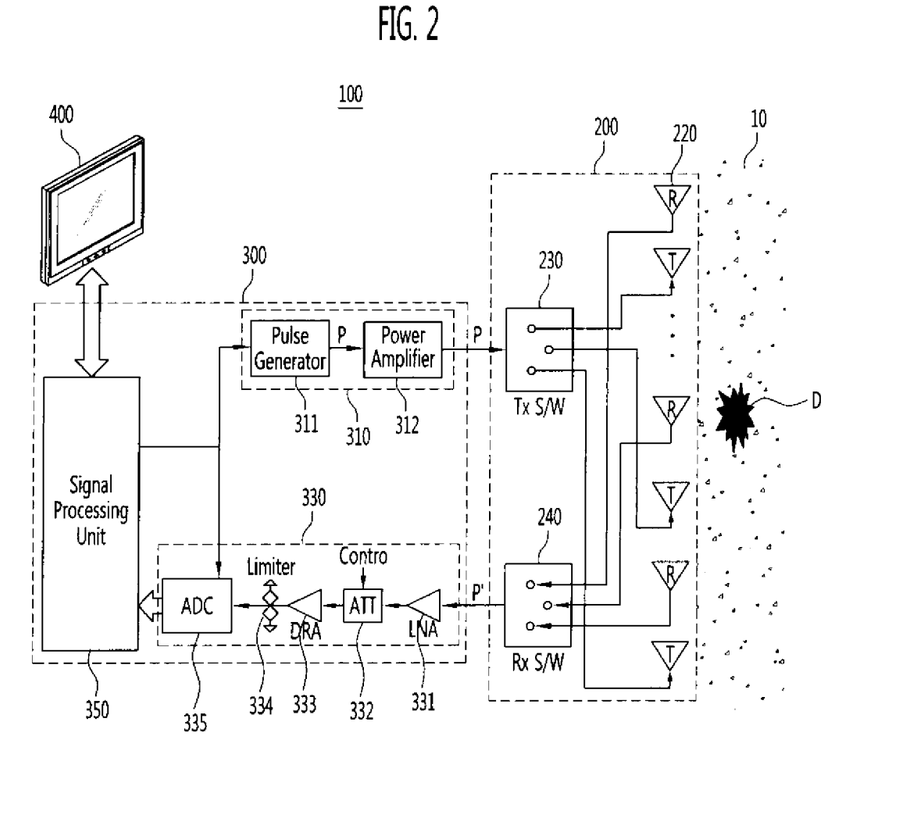
FIG. 2 is a block diagram illustrating a two-dimensional array antenna and a device for detecting an internal object using the same according to an exemplary embodiment of the present invention.
Figure 3:
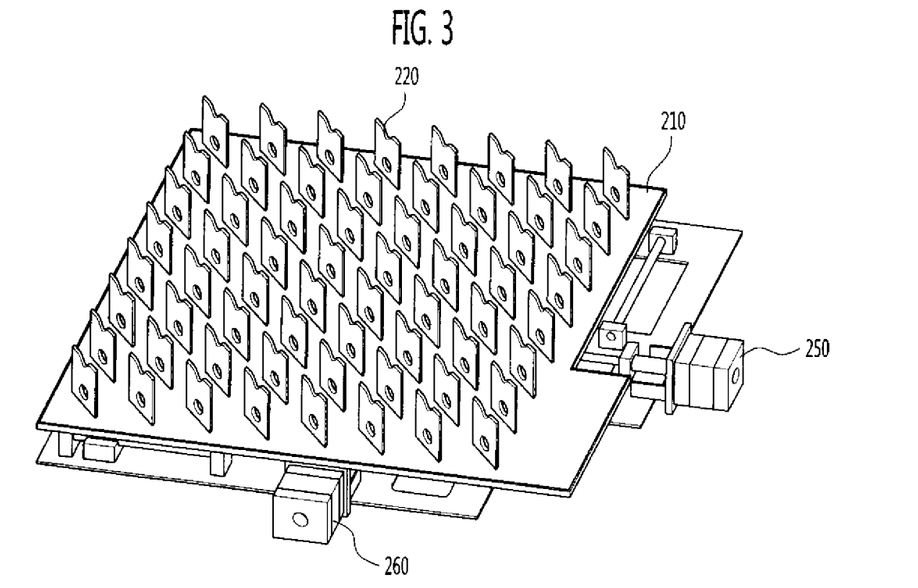
FIG. 3 illustrates an example of the two-dimensional array antenna of FIG. 2.
Figure 4A:
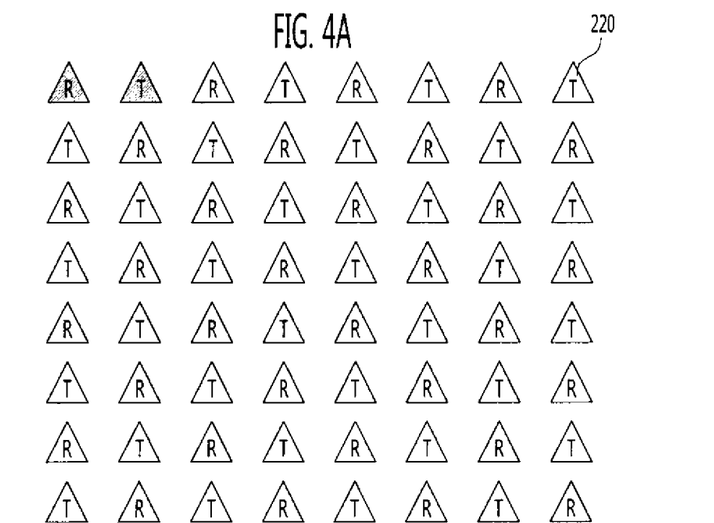
FIGS. 4A through 4H illustrate an example of a switching combination of the unit antennas illustrated in FIG. 3.
Figure 4B:
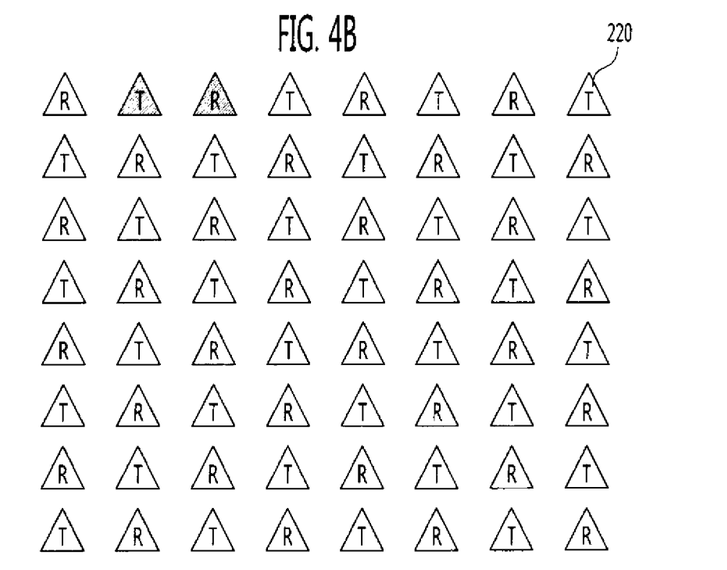
Figure 4C:
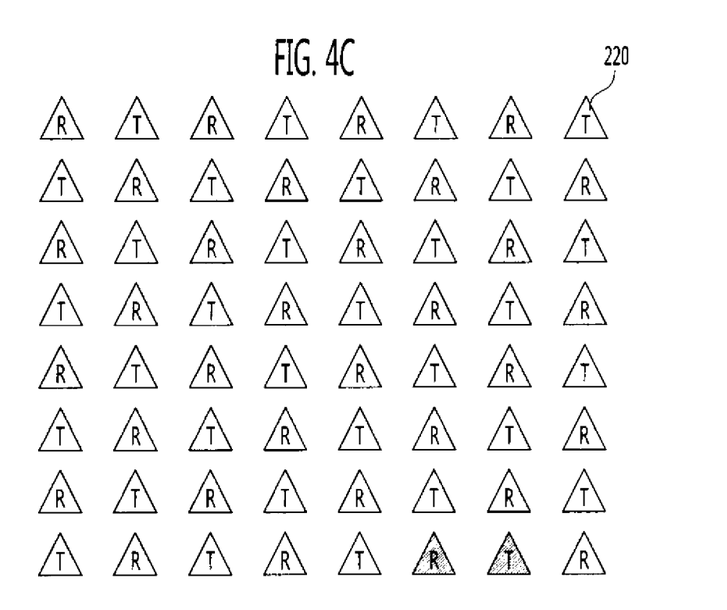
Figure 4D:
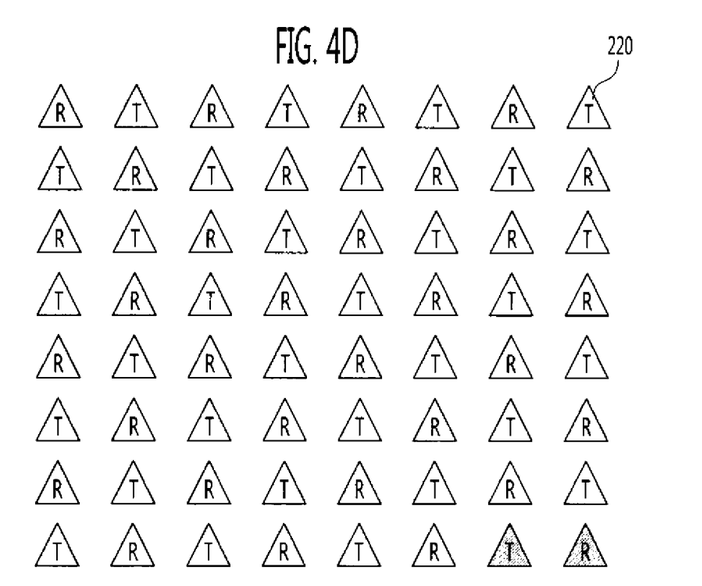
Figure 4E:
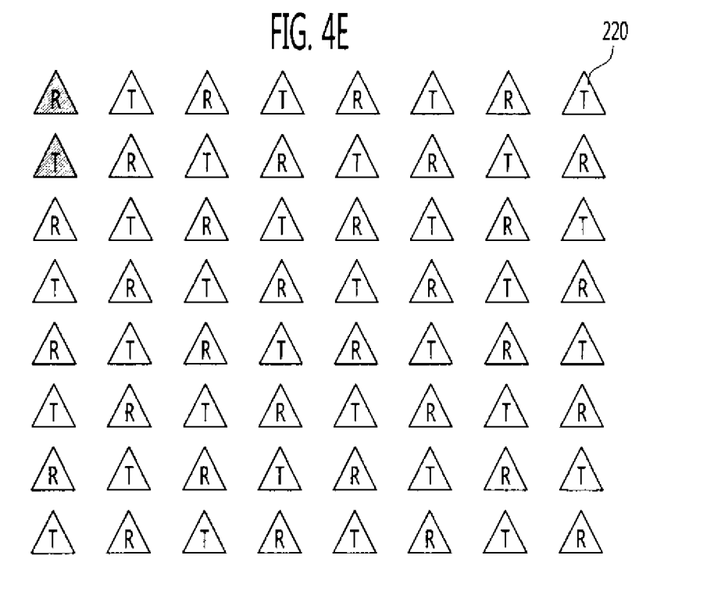
Figure 4F:
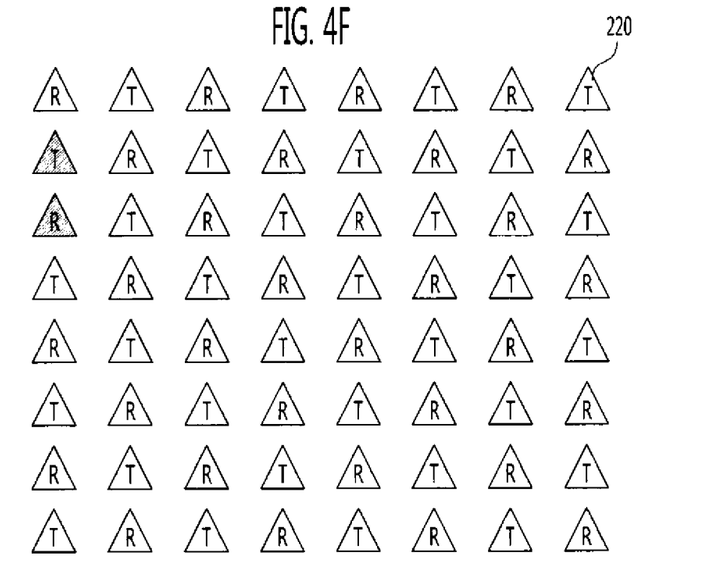
Figure 4G:
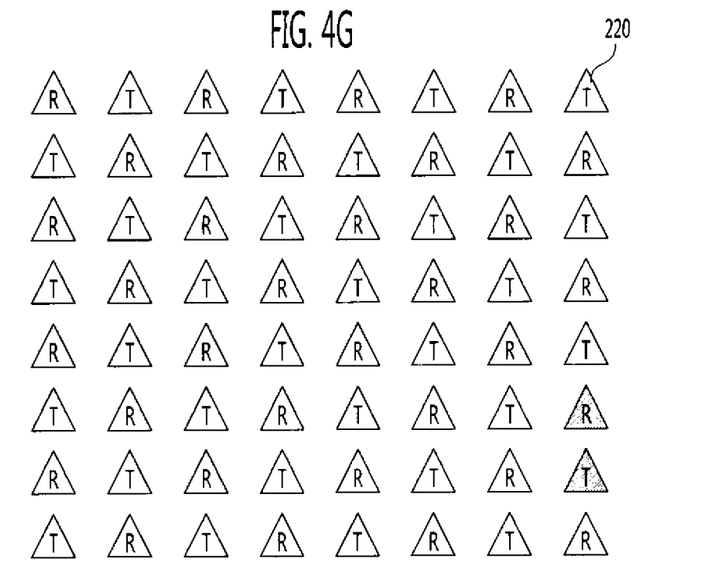
Figure 4H:
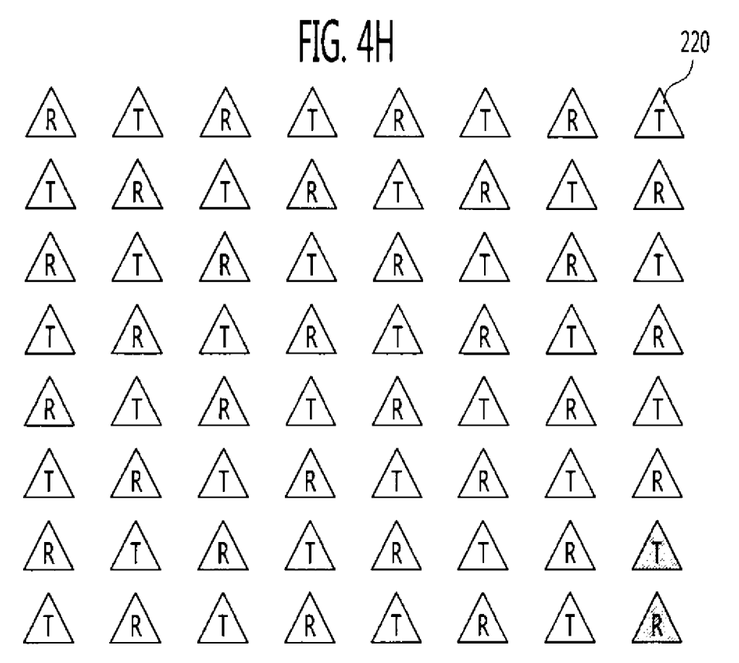

FIG. 2 is a block diagram illustrating a two-dimensional array antenna and a device for detecting an internal object using the same according to an exemplary embodiment of the present invention. FIG. 3 illustrates an example of the two-dimensional array antenna of FIG. 2.

Referring to FIGS. 2 and 3, the two-dimensional array antenna 200 according to an exemplary embodiment of the present invention includes a plurality of unit antennas 220 arranged in a two-dimensional array of m columns and n rows separated from each other on a board 210 (where m and n are integers greater than 1), a first switch 230 selecting one or more transmitting antennas T applying a pulse signal P from among the unit antennas 220, a second switch 240 selecting one or more receiving antennas R collecting a reflected signal P' from among the unit antennas 220, and first and second motors 250 and 260 moving a position of the board 210 on which the unit antennas 220 are set in array in transverse and longitudinal directions.

More specifically, one or more unit antennas 220 connected with the first switch 230 serve as the transmitting antennas T that radiate the pulse signal P onto an internal object D, and one or more unit antennas 220 connected with the second switch 240 serve as the receiving antennas R that collect the signal P' reflected from the internal object D.

Further, the first motor 250 moves the position of the board 210 on which the unit antennas 220 are set in array in the transverse direction that is the lengthwise direction of the board 210, and the second motor 260 moves the position of the board 210 in the longitudinal direction that is the width direction of the board 210.

Here, the two-dimensional antenna 200 is moved in the transverse (lengthwise) direction of the board 210 by a predetermined interval (e.g., 5 mm) using the first motor 250, and collect the reflected signals P'. After the collection is completed, the two-dimensional antenna 200 is moved in the transverse direction by a predetermined interval (e.g., 5 mm) again, and collect the reflected signals P'. These processes may be repeated until the displacement covers a separation distance (e.g., 4.5 cm) between the unit antennas.

The transceiving analysis module 300 includes a transmitting unit 310 generating the pulse signal P and amplifying the power of the pulse signal, a receiving unit 330 collecting the received signal P' from the selected receiving antenna, and a signal processing unit 350 providing a trigger signal for generating the pulse signal P to the transmitting unit 310, receiving the reflected signal P' from the receiving unit 330, and analyzing information about the position and shape of an internal object D on the basis of the reflected signal P'.

The transmitting unit 310 generates the pulse signal P from a pulse generator 311 according to the trigger input signal from the signal processing unit 350, and amplifies the power of the generated pulse signal P at the power amplifier 312.

Here, the pulse signal P may use a mono-cycle pulse having rising and falling times of several tens of picoseconds and a width of several hundreds of picoseconds.

The receiving unit 330 amplifies the received signal P' at a low-noise amplifier 331, the signal at an attenuator 332, controls the signal power at a drive amplifier 333, and converts the signal into a digital signal at an analog-to-digital converter (ADC) 335.

The signal processing unit 350 receives the digital signal from the receiving unit 330, and analyzes the information about the position and shape of the internal object D on the basis of the digital signal.

The display module 400 displays the information about the position and shape of the internal object D. The information about the position and shape of the internal object D may be displayed in a two-dimensional or three-dimensional image by the display module 400.

According to an exemplary embodiment, the unit antennas 220 in the two-dimensional array are operated as the transmitting antennas T and the receiving antennas R without moving the position of the device for detecting an internal object D, and thus it is possible to detect the position and shape of the internal object D in real time. The reason why the real-time detection is possible will be described below in detail.

In general, distance resolution ΔR and cross range resolution $\Delta A_r$ of a radar are given as in Equation 1 below.

$$\Delta R = \frac{v}{2B}$$
$$\Delta A_r = \frac{Rv}{LB}$$

Equation 1 where, v is a propagation speed [cm/s] in a medium, B is a bandwidth [GHz], R is a corresponding distance [cm], and L is a size [cm] of an aperture of the antenna.

In this embodiment, to implement a nondestructive testing apparatus having a small size and excellent resolution at a close range, the size L of the aperture of the two-dimensional array antenna 200 may be 31.5 cm, and the bandwidth B may be 9 GHz (from 1 GHz to 10 GHz). Each unit antenna 220 of the two-dimensional array antenna 200 may be designed of a taper slot antenna such that can radiate an ultra wide-band (UWB) pulse signal of 9 GHz bandwidth without distortion in time domain and can be manufactured in compact size.

Here, the size of each unit antenna 220 is set to 30 mm×50 mm, and each unit antenna 220 may be fixed at an angle of 45 degrees inclined in the transverse or longitudinal direction of the board 210 in order to minimize a difference between beamwidths of the unit antenna 220 in the horizontal and vertical directions. The interval between the unit antennas 220 can be designed to be 4.5 cm in consideration of the resolution, and coupling between adjacent antennas for the 9 GHz bandwidth, and so on.

FIGS. 4A through 4H illustrate an example of a switching combination of the unit antennas illustrated in FIG. 3.

For convenience of description, the case where 64 unit antennas 220 are arrayed in 8 columns and 8 rows and are operated as the transmitting antennas T and the receiving antennas R will be described as an example.

First, as illustrated in FIGS. 4A through 4D, 64 unit antennas 220 are operated as the transmitting antennas T and the receiving antennas R in the lengthwise direction, i.e. the transverse direction, of the board 210. Then, pulse signals P are radiated onto an internal object D using the transmitting antennas T, and the signals P' reflected from the internal object D are sequentially collected using the receiving antennas R.

Next, as in FIGS. 4E through 4H, to account for both a direction in which the internal object D is placed and a polarization of the antenna, the unit antennas 220 are also operated as the transmitting antennas T and the receiving antennas R in the width direction, i.e. the longitudinal direction, of the board 210. Then, the pulse signals P are radiated onto an internal object D using the transmitting antennas T, and the signals P' reflected from the internal object D are sequentially collected using the receiving antennas R.

A total elapsed time $T_t$ that is taken to obtain the reflected signals P' by switching of the unit antennas 200 can be calculated as in Equation 2 below.

$$T_t = N_{pa}\left(t_{sw} + \frac{t_{pd}}{t_{si}} \times \frac{1}{f_s} \times N_{av}\right) \qquad \text{Equation 2}$$

where $N_{pa}$ is the number of switching combinations of the unit antennas 220, $t_{sw}$ is the switching time [s] of the first and second switches 230 and 240, $t_{pd}$ is the round-trip propagation time [s] of the pulse signal, $t_{si}$ is the sampling interval [s] of the ADC 335, $f_s$ is the sampling rate of the ADC 335, and $N_{av}$ is the average number of the signal collection.

According to Equation 2, the total elapsed time $T_t$ that is taken to obtain the reflected signals P' in this embodiment is calculated as being 71 ms.

According to an exemplary embodiment of the present invention, the unit antennas 220 in the two-dimensional array are operated as the transmitting antennas T and the receiving antennas R without moving the device for detecting an internal object D, and thus it is possible to detect the position and shape of the internal object D in real time.

Meanwhile, the device for detecting an internal object D according to an exemplary embodiment of the present invention moves the position of the two-dimensional array antenna 200 in the transverse and longitudinal directions, and thus can more precisely detect the position and shape of the internal object D. This will be described below in greater detail.

Figure 5A:
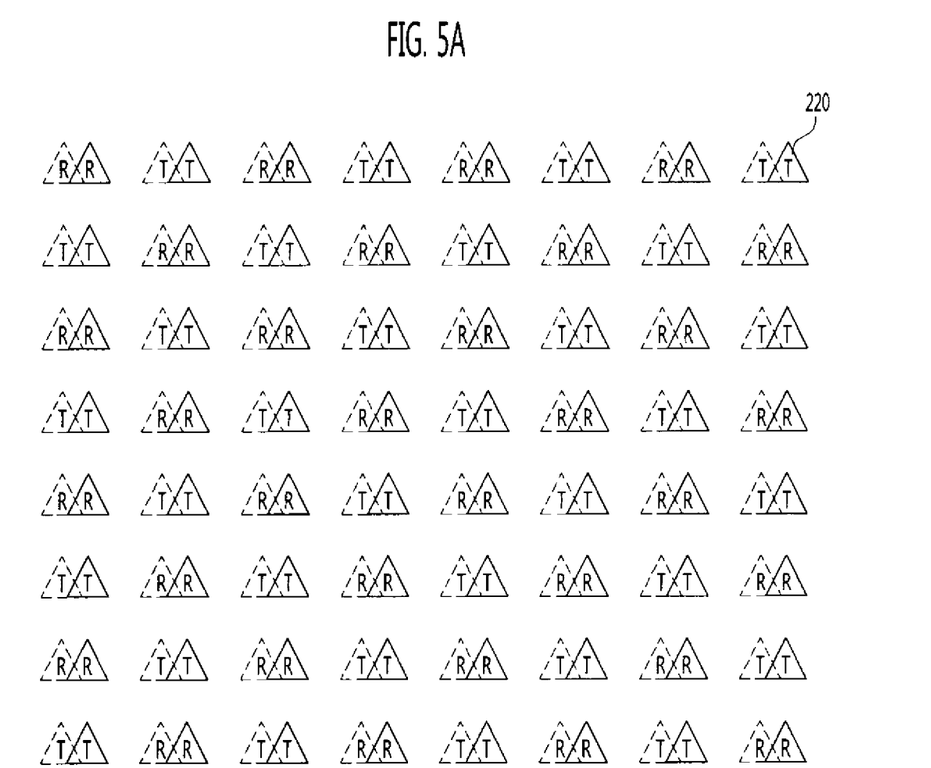
FIGS. 5A and 5B are views for explaining a two-dimensional array antenna and a method of detecting an internal object using the same according to an exemplary embodiment of the present invention.
Figure 5B:
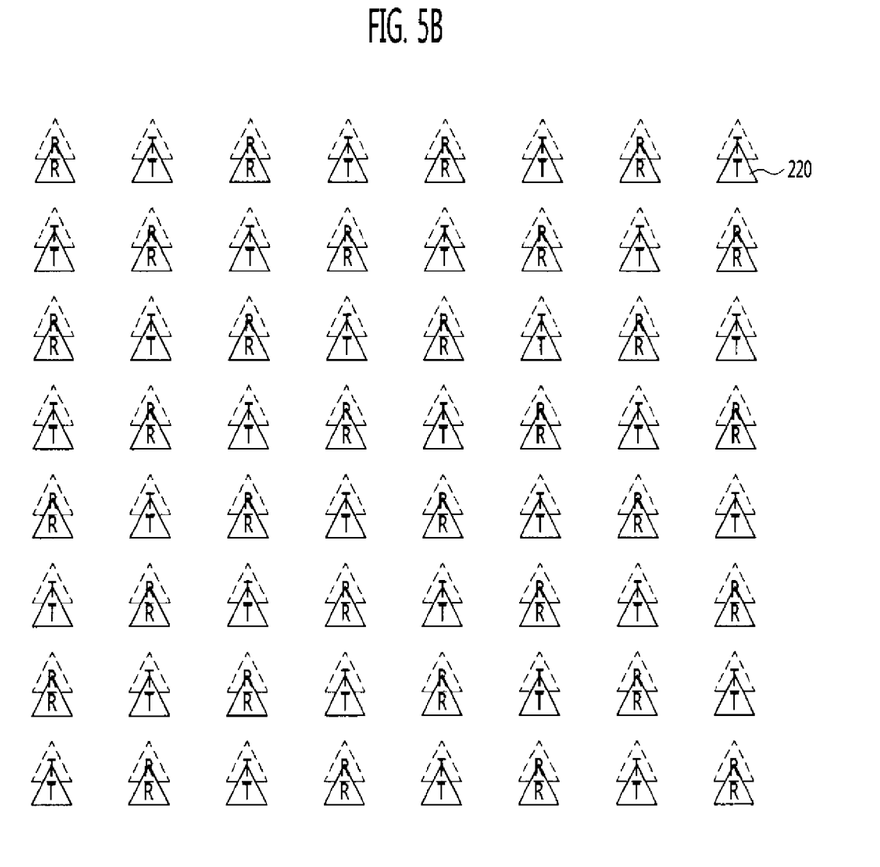

FIGS. 5A and 5B are views for explaining a two-dimensional array antenna and a method of precision detection according to an exemplary embodiment of the present invention.

For convenience of description, it is assumed that initial setting for an interval between the unit antennas 220, a penetration depth, a dielectric constant of the medium, etc. is completed.

With respect to an area that the internal object D is suspected to occupy, first, the unit antennas 220 are switched as the transmitting antennas T and the receiving antennas R, and the reflected signals P' are collected using the receiving antennas R.

Then, as in FIG. 5A, the two-dimensional antenna 200 is moved in the transverse (lengthwise) direction of the board 210 by a predetermined interval (e.g., 5 mm) using the first motor 250, and collect the reflected signals P'. After the collection is completed, the two-dimensional antenna 200 is moved in the transverse direction by a predetermined interval (e.g., 5 mm) again, and collect the reflected signals P'. These processes may be repeated until the displacement covers a separation distance (e.g., 4.5 cm) between the unit antennas. This series of processes may be configured to be automatically carried out by the two-dimensional antenna 200.

Here, the collected signals P' are transferred to the signal processing unit 350, and are subjected to average process, so that it is possible to obtain more accurate information about the position and shape of the internal object D. This method allows the unit antennas to be moved on the suspected area (e.g., 35 cm×35 cm) only by the separation distance (e.g., 4.5 cm) between the unit antennas, so that it is possible to collect the signals at a high speed, and to increase the number of signal collecting points to detect the accurate position and the precise shape of the internal object D.

According to exemplary embodiments of the present invention, a two-dimensional array antenna and a device for detecting an internal object using the same can detect the position and shape of an internal object in real time.

Further, the two-dimensional array antenna and the device for detecting an internal object using the same can move the numerous unit antennas in the transverse and longitudinal directions to more precisely detect the position and shape of the internal object.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A two-dimensional array antenna comprising:
    a plurality of unit antennas arranged in a two-dimensional array of m columns and n rows, which are separated by a first distance from each other, on a board (where m and n are integers greater than 1);
    a first switch selecting one or more transmitting antennas to radiate a pulse signal onto an internal object in a structure from among the unit antennas;
    a second switch selecting one or more receiving antenna to collect a signal reflected from the internal object from among the unit antennas;
    a first motor moving a position of the hoard on which the unit antennas are set in array in a transverse direction that is a lengthwise direction of the board; and
    a second motor moving the position of the board on which the unit antennas are set in array in a longitudinal direction that is a width direction of the board,
    wherein the unit antennas arranged in the two-dimensional array are moved in the transverse direction using the first motor or in the longitudinal direction using the second motor by a second distance less than the first distance within an area where the internal object is expected to be present,
    wherein each of the unit antennas is tilted at an angle of 45 degrees with respect to the transverse or longitudinal direction of the board,
    wherein each of the columns includes both the transmitting antennas and the receiving antennas, and each of the rows includes both the transmitting antennas and the receiving antennas, and
    wherein adjacent unit antennas are rectangularly arranged in the transverse and longitudinal directions of the board.

2. The two-dimensional array antenna according to claim wherein the unit antennas are repeatedly moved both in the transverse direction and in the longitudinal direction by the second distance until a total of the second distances that the unit antennas move through reaches up to the first distance, and the selected one or more transmitting antennas radiate the pulse signal and the selected one or more receiving antennas collect the reflected signal sequentially while the unit antennas arranged in the two-dimensional array are moved in both the transverse direction and the longitudinal direction by the second distance.

3. The two-dimensional array antenna according to claim 1, wherein each unit antenna includes a taper slot antenna having a bandwidth between 1 GHz and 10 GHz.

4. A device for detecting an internal object, comprising:
the two-dimensional array antenna according to claim 1; and
a transceiving analysis module that includes a transmitting unit generating a pulse signal and transmitting the generated pulse signal to a selected transmitting antenna, a receiving unit collecting a reflected signal from a selected receiving antenna, and a signal processing unit providing a trigger signal for generating the pulse signal to the transmitting unit, digitizing the reflected signal from the receiving unit, and analyzing information about the position and shape of the internal object on the basis of the reflected signal.

5. The device according to claim 4, wherein the transmitting unit generates the pulse signal according to the trigger input signal from the signal processing unit, and amplifies the power of the generated pulse signal.

6. The device according to claim 4, wherein the receiving unit performs low-noise amplification, attenuation, and power adjustment on the received signal, and converts the received signal into a digital signal.

7. The device according to claim 4, further comprising a display module displaying the information about the position and shape of the internal object analyzed by the transceiving analysis module, wherein the information about the position and shape of the internal object is displayed on the display module in a two-dimensional or three-dimensional image.

* * * * *